United States Patent
Fukumasu et al.

(10) Patent No.: US 11,595,539 B2
(45) Date of Patent: Feb. 28, 2023

(54) IMAGE READING APPARATUS WITH ROTATABLE MAIN BODY

(71) Applicant: Seiko Epson Corporation, Tokyo (JP)

(72) Inventors: Keiichiro Fukumasu, Kitakyushu (JP); Tomoyuki Mokuo, Kitakyushu (JP); Masahiro Kimura, Koga (JP); Sota Ishibashi, Kurume (JP); Yasuki Nogami, Nagoya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/364,053

(22) Filed: Jun. 30, 2021

(65) Prior Publication Data

US 2021/0329142 A1    Oct. 21, 2021

Related U.S. Application Data

(63) Continuation of application No. 16/909,016, filed on Jun. 23, 2020, now Pat. No. 11,076,066.

(30) Foreign Application Priority Data

Jun. 25, 2019    (JP) .................................. 2019-117213

(51) Int. Cl.
*H04N 1/04* (2006.01)
*H04N 1/00* (2006.01)

(52) U.S. Cl.
CPC ..... *H04N 1/00888* (2013.01); *H04N 1/00037* (2013.01); *H04N 1/00798* (2013.01); *H04N 1/00891* (2013.01); *H04N 1/00896* (2013.01)

(58) Field of Classification Search
None
See application file for complete search history.

(56) References Cited

U.S. PATENT DOCUMENTS

| | | | |
|---|---|---|---|
| 6,388,775 B1 | 5/2002 | Chiu | |
| 2007/0188818 A1* | 8/2007 | Westcott | H04N 1/00583 358/296 |
| 2013/0163056 A1* | 6/2013 | Hanayama | H04N 1/00037 358/474 |
| 2016/0316087 A1 | 10/2016 | Hanayama | |
| 2018/0007221 A1* | 1/2018 | Mokuo | B65H 31/02 |
| 2018/0041651 A1* | 2/2018 | Nakamura | H04N 1/00588 |
| 2019/0132464 A1* | 5/2019 | Miyauchi | H04N 1/00602 |
| 2019/0297215 A1 | 9/2019 | Miyauchi | |
| 2020/0076974 A1 | 3/2020 | Koyanagi et al. | |

FOREIGN PATENT DOCUMENTS

JP    2009-527143    7/2009

* cited by examiner

*Primary Examiner* — Dung D Tran
(74) *Attorney, Agent, or Firm* — Workman Nydegger

(57) ABSTRACT

An image reading apparatus includes a first posture detection unit that detects a first posture that is a posture of the apparatus main body when not in use, a second posture detection unit that detects a second posture that is a posture of the apparatus main body when in use, and a posture change detection unit that detects a change in a posture of the apparatus main body. When the first posture detection unit detects a switchover of the apparatus main body to the first posture in a first power supply mode in which power is supplied to the first posture detection unit, the second posture detection unit, and the posture change detection unit, the first power supply mode transitions to the second power supply mode in which a controller supplies power to only the posture change detection unit.

15 Claims, 16 Drawing Sheets

IMAGE READING APPARATUS WITH ROTATABLE MAIN BODY

The present application is a continuation of U.S. patent application Ser. No. 16/909,016, filed Jun. 23, 2020, which claims priority from JP Patent Application No. 2019-117213, filed Jun. 25, 2019, the disclosures of which are hereby incorporated by reference herein in their entireties.

BACKGROUND

1. Technical Field

The present disclosure relates to an image reading apparatus that reads a document image.

2. Related Art

As shown in JP-T-2009-527143, a scanner, which is an example of an image reading apparatus, may be configured to change the installation posture by switching between a first state in which a sheet transport path provided in a housing constituting the apparatus main body is inclined with respect to a horizontal direction, and a second state in which the sheet transport path in the second state is closer to the horizontal direction than that in the first state.

In the first state of the image reading apparatus of JP-T-2009-527143, the sheet transport path is inclined with respect to the horizontal direction, so that the size of the device can be suppressed. The sheet transport path in the second state is closer to the horizontal direction than that in the first state, so that when discharging a highly rigid sheet, it is possible to prevent the leading edge of the sheet from colliding with a floor surface on which the image reading apparatus is mounted.

In recent years, the image reading apparatus has been required to further reduce power consumption, but no special measures from the viewpoint of power saving according to the posture were taken in a configuration in which a posture can be changed as in an image reading apparatus in the related art, particularly, an image reading apparatus described in JP-T-2009-527143.

SUMMARY

According to an aspect of the present disclosure, an image reading apparatus of the present disclosure includes an apparatus main body including a reading unit that reads a document, where the apparatus main body is configured to change a posture with respect to the support unit, a first posture detection unit that detects a first posture that is a posture of the apparatus main body when not in use, a second posture detection unit that detects a second posture that is a posture of the apparatus main body when the reading unit reads a document, where the apparatus main body has a projection area with respect to the mounting face in the second posture larger than a projection area with respect to the mounting face in the first posture, a posture change detection unit that detects a change in a posture of the apparatus main body, and a controller that controls a power supply to each of the first posture detection unit, the second posture detection unit, and the posture change detection unit, wherein when the first posture detection unit detects a switchover of the apparatus main body to the first posture in a first power supply mode in which power is supplied to the first posture detection unit, the second posture detection unit, and the posture change detection unit when the apparatus main body is in the second posture, the controller causes the first power supply mode to transition to a second power supply mode in which no power is supplied to the first posture detection unit and the second posture detection unit, but power is supplied to the posture change detection unit.

DESCRIPTION OF EXEMPLARY EMBODIMENTS

Figure 1:
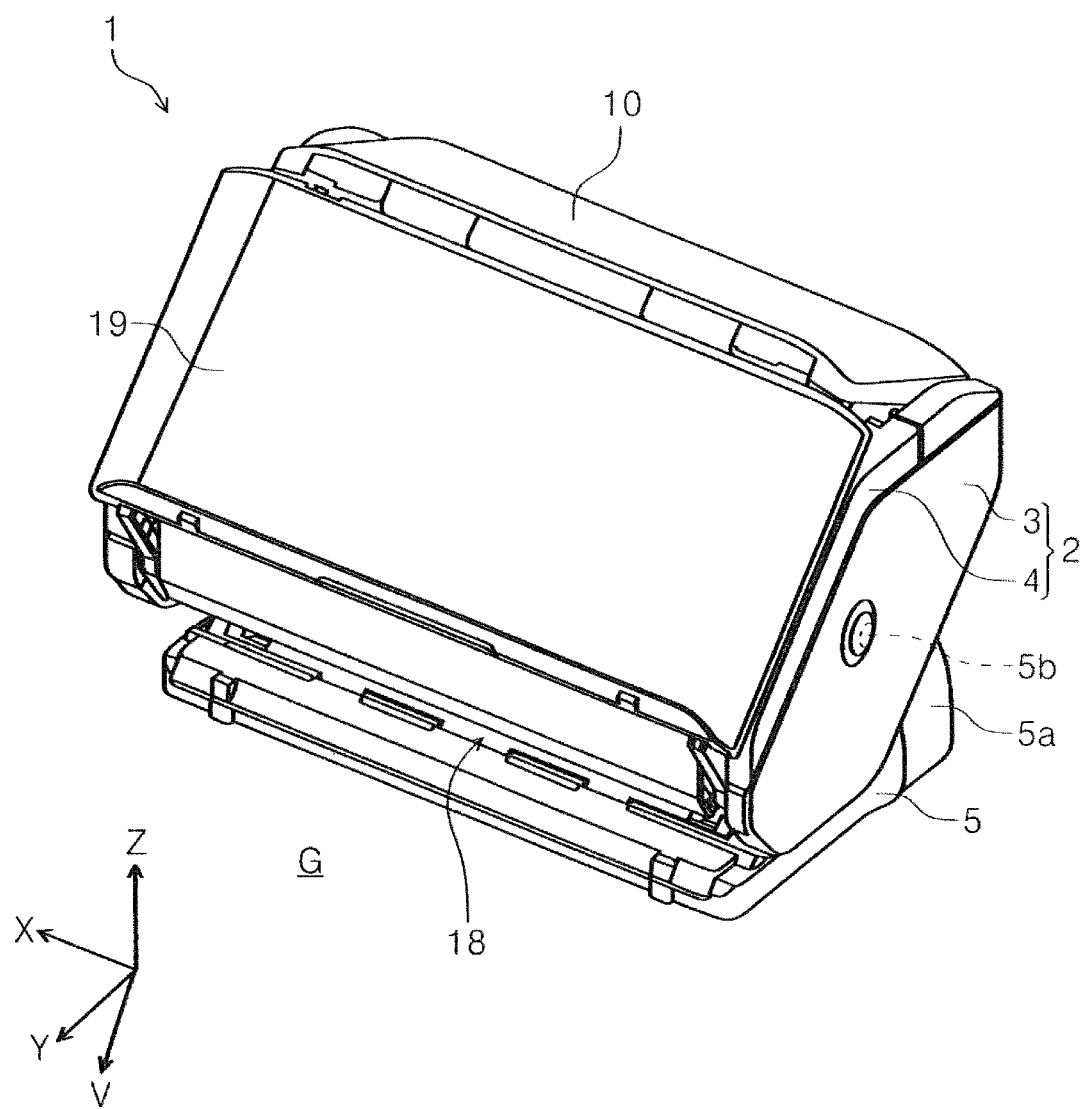
FIG. 1 is an external perspective view of an apparatus main body in a second posture as viewed from the front.

Hereinafter, the present disclosure will be schematically described. An image reading apparatus according to a first aspect includes an apparatus main body including a reading unit that reads a document, where the apparatus main body is configured to change a posture with respect to the support unit, a first posture detection unit that detects a first posture that is a posture of the apparatus main body when not in use, a second posture detection unit that detects a second posture that is a posture of the apparatus main body when the reading unit reads a document, where the apparatus main body has a projection area with respect to the mounting face in the second posture larger than a projection area with respect to the mounting face in the first posture, a posture change detection unit that detects a change in a posture of the apparatus main body, and a controller that controls a power supply to each of the first posture detection unit, the second posture detection unit, and the posture change detection unit, wherein when the first posture detection unit detects a switchover of the apparatus main body to the first posture in a first power supply mode in which power is supplied to the first posture detection unit, the second posture detection unit, and the posture change detection unit when the apparatus main body is in the second posture, the controller causes the first power supply mode to transition to the second power supply mode in which no power is supplied power to the first posture detection unit and the second posture detection unit, but power is supplied to the posture change detection unit.

According to this aspect, when a posture switches to a first posture, which is a posture when the apparatus main body is not used, the controller cause a mode to transition to a second power supply mode in which power is not supplied to the first posture detection unit and the second posture detection unit, but power is supplied to the posture change detection unit, so that it is possible to reduce power consumption, and the dedicated user operation for shifting a state to the state in which such power consumption is suppressed is not required, resulting in improved usability. Further, even in the second power supply mode, power is supplied to the posture change detection unit, so that when the change in a posture of the apparatus main body is detected, it is possible to return to the first power supply mode.

According a second aspect, in the image reading apparatus according to the first aspect, when the posture change detection unit detects a change in a posture of the apparatus main body in the second power supply mode, the controller supplies power to at least the second posture detection unit, and when the second posture detection unit detects a switchover of the apparatus main body to the second posture, the controller causes the second power supply mode to transition to the first power supply mode.

According to this aspect, when the posture change detection unit detects a change in a posture of the apparatus main body in the second power supply mode, the controller supplies power to at least the second posture detection unit, and when the second posture detection unit detects a switchover of the apparatus main body to the second posture, the controller causes the second power supply mode to transition to the first power supply mode, so that the dedicated user operation for shifting a mode from the second power supply mode to the first power supply mode is not required, resulting in improved usability.

According to a third aspect, the image reading apparatus according to the second aspect further includes an operation unit that receives various operations and outputs a signal according to each of the operations to the controller, wherein when there is no input of a signal for a predetermined time from the operation unit in a state where the apparatus main body is in the second posture, the controller causes a mode to transition to a third power supply mode in which power is supplied to at least the posture change detection unit, where a power consumption of the entire image reading apparatus in the third power supply mode is smaller than a power consumption of the entire image reading apparatus in the first power supply mode and larger than a power consumption of the entire image reading apparatus in the second power supply mode, and wherein when the posture change detection unit detects a change in a posture of the apparatus main body in a state of the third power supply mode, the controller supplies power to at least the first posture detection unit, and when the first posture detection unit detects a switchover of the apparatus main body to the first posture, the controller causes the third power supply mode to transition to the first power supply mode.

According to this aspect, when there is no input of a signal for a predetermined time from the operation unit in a state where the apparatus main body is in the second posture, the controller causes a mode to transition to a third power supply mode in which power is supplied to at least the posture change detection unit, where a power consumption of the entire image reading apparatus in the third power supply mode is smaller than a power consumption of the entire image reading apparatus in the first power supply mode and larger than a power consumption of the entire image reading apparatus in the second power supply mode, so that it is possible to reduce power consumption, and the dedicated user operation for shifting a state to the state in which such power consumption suppressed is not required, resulting in improved usability. When the posture change detection unit detects a change in a posture of the apparatus main body in the third power supply mode, the controller supplies power to at least the first posture detection unit, and when the first posture detection unit detects a switchover of the apparatus main body to the first posture, the controller causes the third power supply mode to transition to the first power supply mode, so that the dedicated user operation for shifting a mode from the third power supply mode to the first power supply mode is not required, resulting in improved usability.

According to a fourth aspect, in the image reading apparatus according to the third aspect, in a posture change range in which the apparatus main body is configured to change a posture between the first posture and the second posture, a position at which the posture change detection unit is configured to detect a change in a posture of the apparatus main body is set at a position toward the first posture relative to an intermediate position at least in the posture change range, and at a position toward the second posture relative to the intermediate position.

According to this aspect, in a posture change range in which the apparatus main body is configured to change a posture between the first posture and the second posture, a position at which the posture change detection unit is configured to detect a change in a posture of the apparatus main body is set at a position toward the first posture relative to an intermediate position at least in the posture change range, and at a position toward the second posture relative to the intermediate position, so that when the apparatus main body changes its posture from the second posture toward the first posture, or conversely, when the apparatus main body changes its posture from the first posture to the second posture, it is possible to detect the posture change, and it is possible to switch the power supply mode quickly.

According to a fifth aspect, in the image reading apparatus according to the fourth aspect, the posture change detection unit includes a swingable lever, and a lever detection unit that detects an operation of the swingable lever, and wherein the swingable lever swings when the swingable lever is switched between contact of the swingable lever to a contact face extending along the posture change range and separation of the swingable lever from the contact face. According to this aspect, the posture change detection unit can be constituted by a so-called mechanical sensor instead of an optical sensor, so that it is possible to reduce the cost of the apparatus.

Hereinafter, the present disclosure will be described specifically. In this specification, the power supply mode is a name used to indicate the difference in power consumption state, and for example, a state in which power is not supplied to any component of the apparatus, that is, a state in which power consumption is zero, is also one of the power supply modes.

Hereinafter, a scanner 1 that can read at least one of the front side and the back side of a document will be described as an example of the image reading apparatus. The scanner 1 is a so-called document scanner that performs reading while moving a document with respect to a reading unit.

In the X-Y-Z coordinate system shown in each drawing, the X axis direction is a width direction of the apparatus as well as the document width direction. The Y axis direction is a depth direction of the apparatus, and is a direction along the horizontal direction. The Z axis direction is a direction along the vertical direction. The V axis direction is a direction parallel to a document transport path T1, T2, and T3 to be described later, and an angle formed with the Y axis direction changes depending on the posture of the apparatus. In this embodiment, the +Y direction is a direction from the back to the front of the apparatus, and the −Y direction is a direction from the front to the back of the apparatus. Further, the left side is the +X direction and the right side is the −X direction when viewed from the front of the apparatus. Hereinafter, the direction (+V direction) in which the document is transported may be referred to as "downstream", and the opposite direction (−V direction) may be referred to as "upstream".

In FIGS. 1 to 4, the scanner 1 includes an apparatus main body 2 and a support unit 5 that rotatably supports the apparatus main body 2. The apparatus main body 2 includes a lower unit 3 and an upper unit 4. The upper unit 4 is provided so as to be openable and closable by rotating about a rotation shaft (not shown) with respect to the lower unit 3, and it is possible to expose a document transport path to be describe later by opening the upper unit 4 forward of the apparatus.

Figure 4:
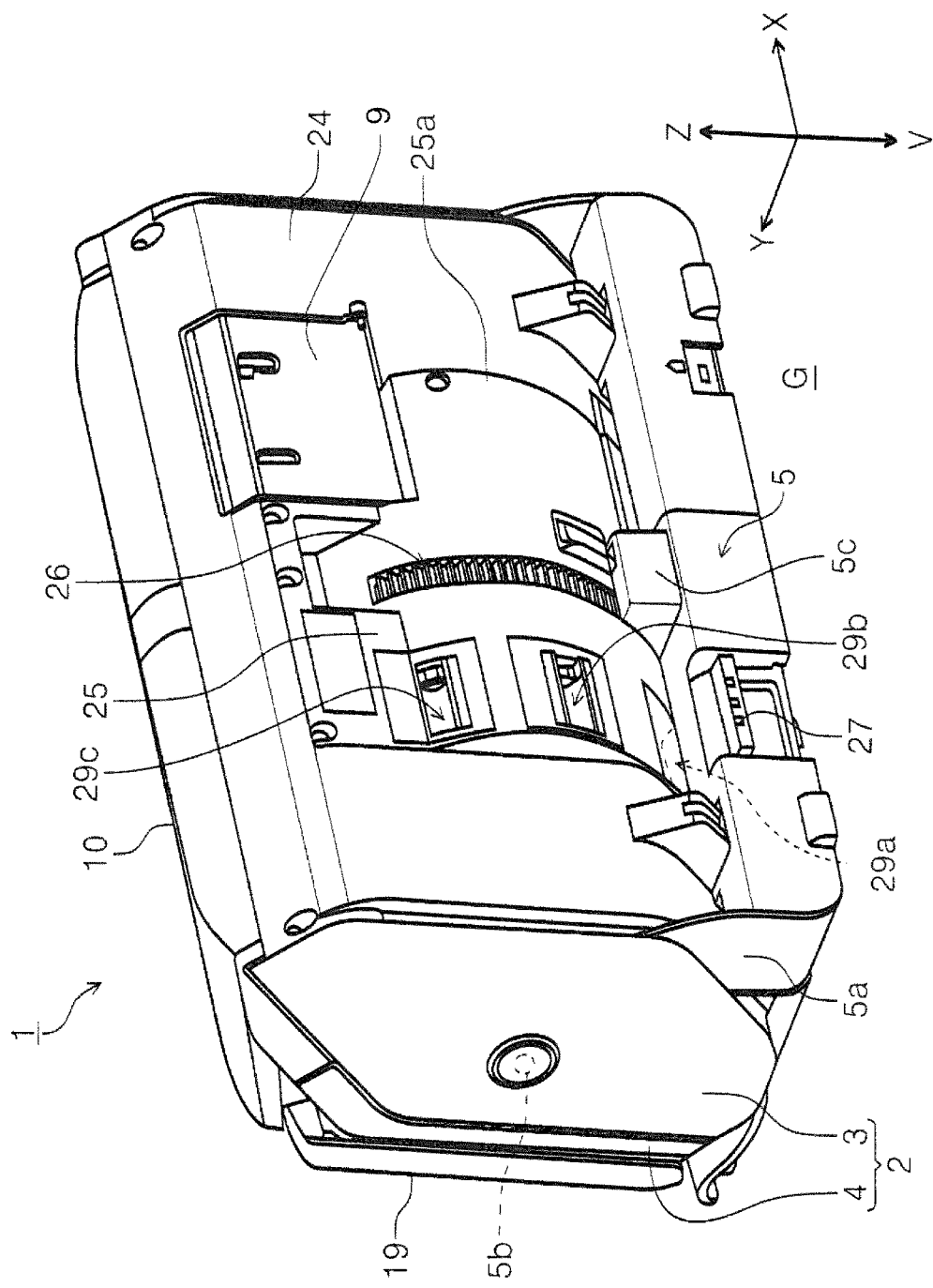
FIG. 4 is an external perspective view of the apparatus main body in a first posture as viewed from the rear.
Figure 5:
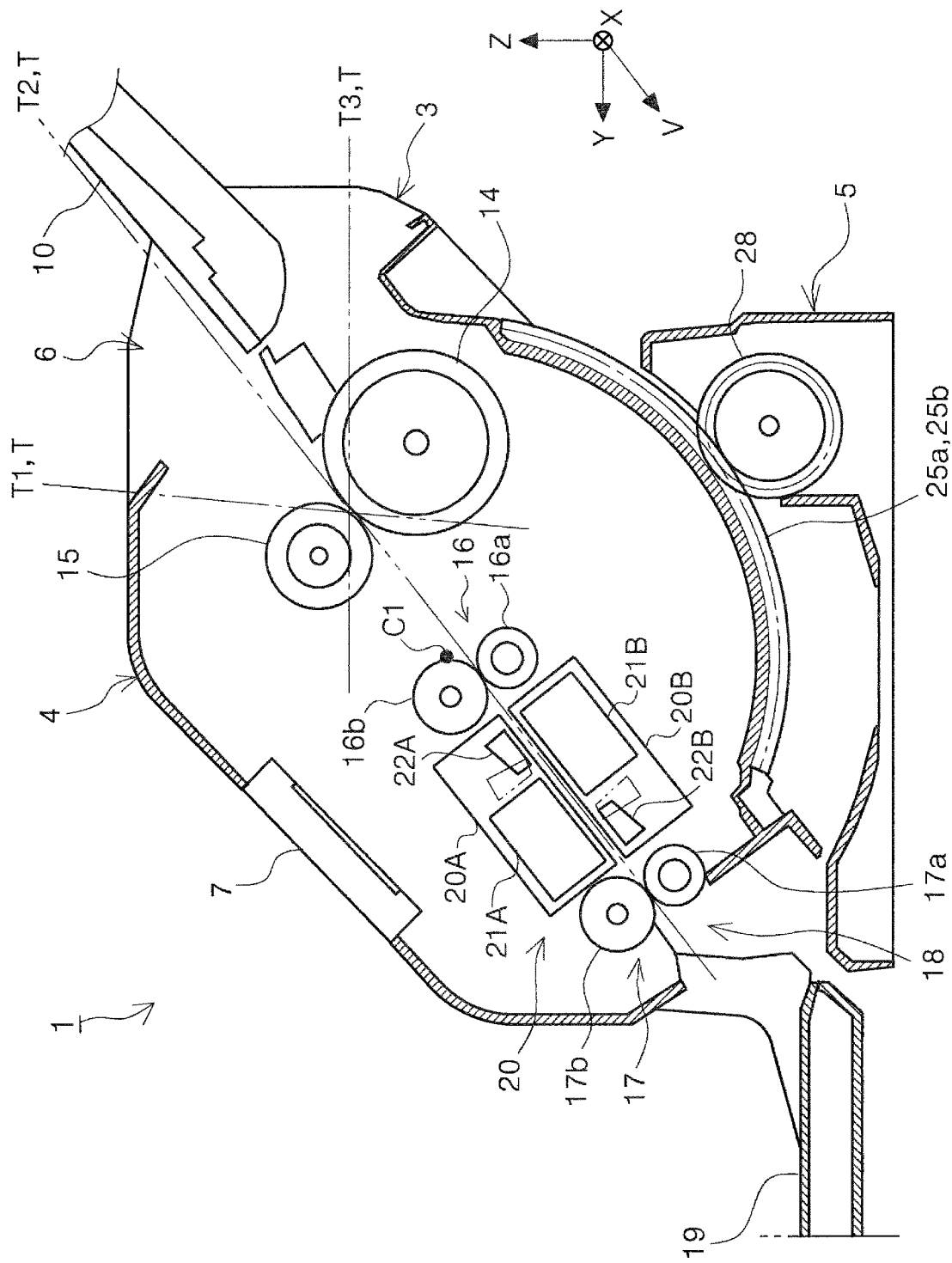
FIG. 5 is a cross-sectional view of a document transport path of the apparatus main body in the second posture as viewed from the width direction.
Figure 6:
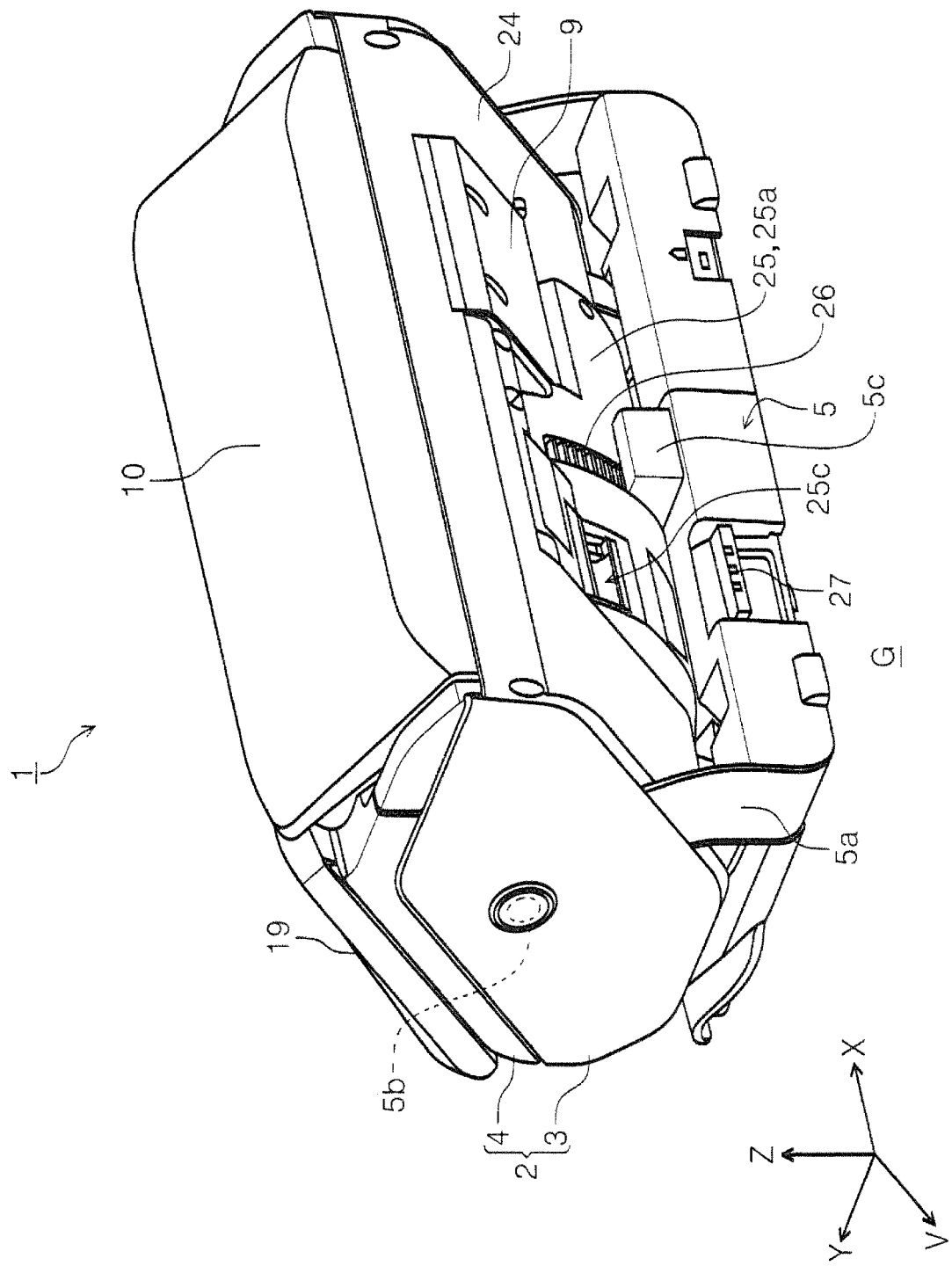
FIG. 6 is an external perspective view of the apparatus main body in the second posture as viewed from the rear.

The lower unit 3 constituting the apparatus main body 2 is rotatably provided via a rotation shaft 5*b* with respect to an arm 5*a* constituting the support unit 5, and is configured to be able to change its posture by rotation. As shown in FIG. 4, the lower unit 3 has an outer shell composed of a first housing 24 and a second housing 25, and the second housing 25 has an arch portion 25*a* having a shape along the rotation locus of the lower unit 3. The arch portion 25*a* is provided with a rack portion 26. The rack portion 26 meshes with a pinion gear 28 provided on the support unit 5 as shown in FIG. 5. A rotational load is applied to the pinion gear 28 by a damper mechanism (not shown), so that the rotation speed when the lower unit 3 rotates, that is, when the apparatus main body 2 changes the posture, is attenuated.

Figure 7:
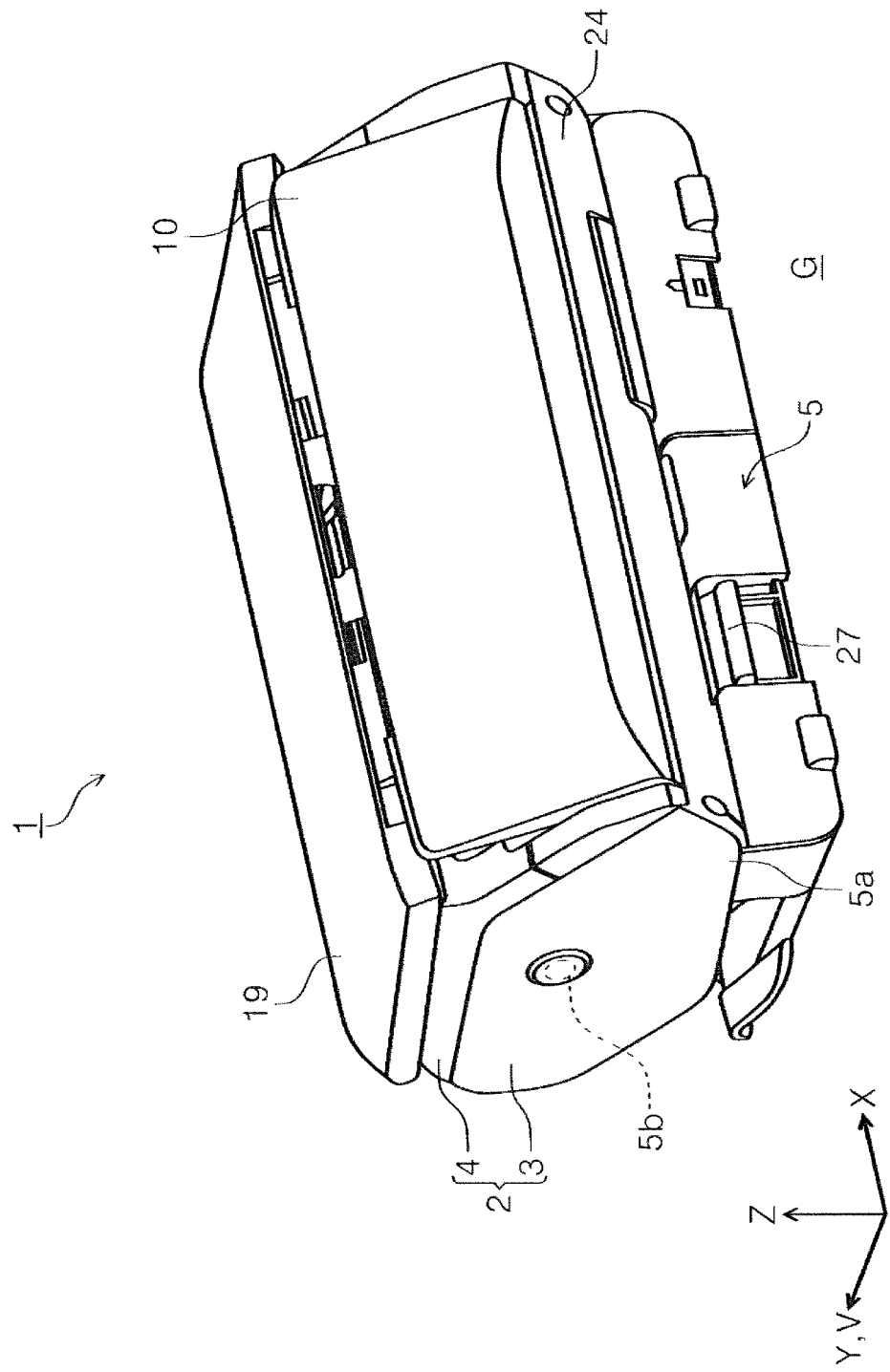
FIG. 7 is an external perspective view of the apparatus main body in a third posture as viewed from the rear.

The apparatus main body 2 of the scanner 1 according to the present embodiment is configured to be able to hold three postures by a posture holding unit to be described later. Two of the three postures is a posture at the time of document reading, and the remaining one is a posture when not in use. The postures shown in FIGS. 1, 2, 5, 6, and 7 are postures at the time of document reading, and the postures shown in FIGS. 3 and 4 are postures when not in use. The posture when not in use shown in FIGS. 3 and 4 is an example of the first posture. Of the postures at the time of document reading, the postures shown in FIGS. 1, 2, 5, and 6 are an example of the second posture, and the posture shown in FIG. 7 is an example of the third posture. In the first posture, the projection area of the scanner 1 on a mounting face G is the smallest, and more specifically, the space occupied in the Y axis direction is the smallest. In the third posture, the projection area of the scanner 1 on the mounting face G is the largest.

Here, the posture holding unit that holds the posture of the apparatus main body 2 will be described. This posture holding unit includes a first recessed portion 29*a*, a second recessed portion 29*b*, and a third recessed portion 29*c* shown in FIG. 4, and an advance/retreat unit 8 shown in FIG. 9. The first recessed portion 29*a*, the second recessed portion 29*b*, and the third recessed portion 29*c* shown in FIG. 4 are provided at intervals along the circumferential direction of the arch portion 25*a* of the second housing 25. The advance/retreat unit 8 shown in FIG. 9 includes a base portion 35, a slider unit 36 provided on the base portion 35 so as to be displaceable in the reciprocating direction with respect to the arch portion 25*a*, a spring 37 for pressing the slider unit 36 toward the arch portion 25*a*, and an operation lever 27 (see FIG. 4) for retracting the slider unit 36 from the arch portion 25*a* against the spring force of the spring 37.

Figure 8:
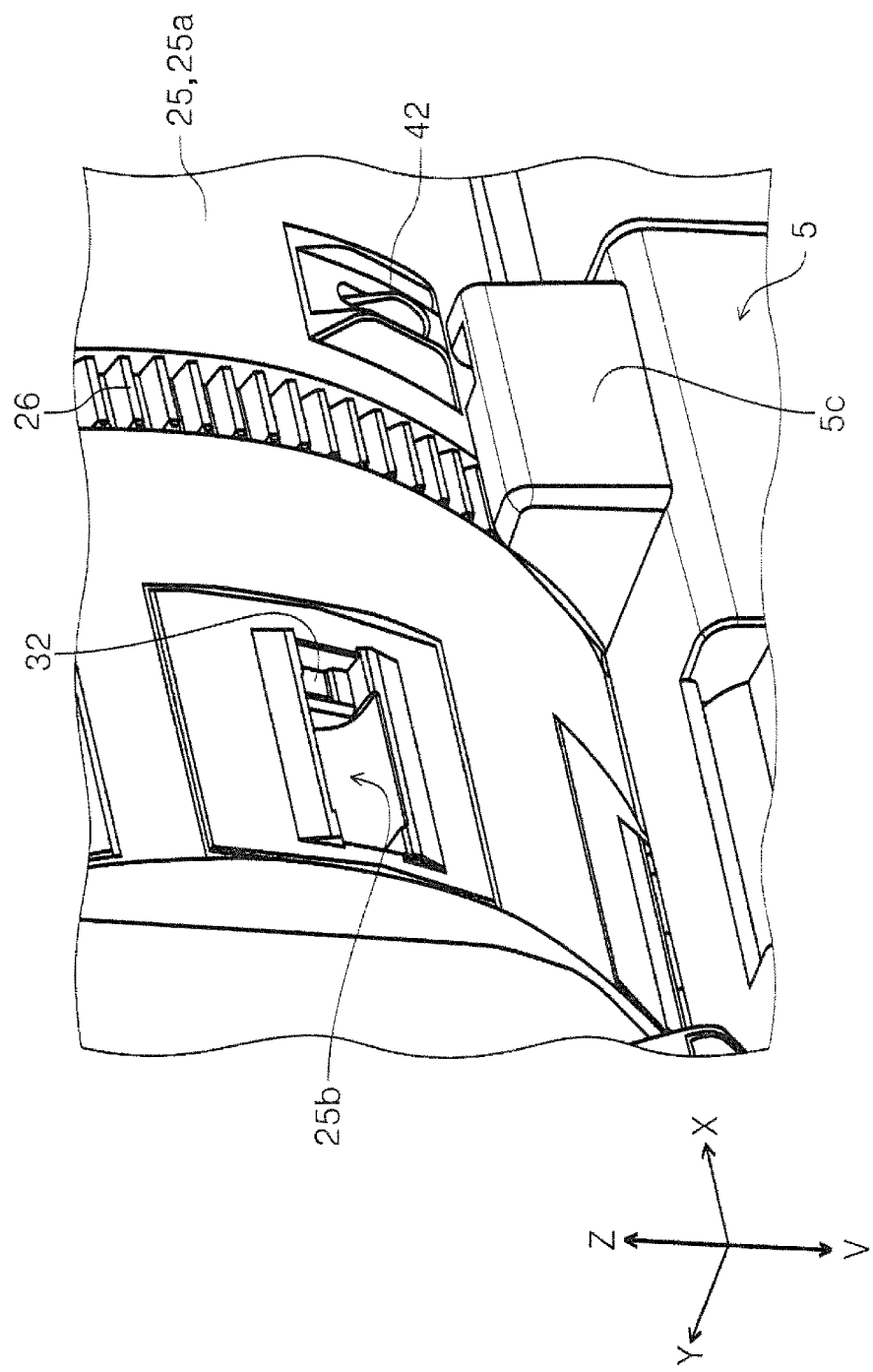
FIG. 8 is a partially enlarged perspective view of FIG. 4.

The slider unit 36 is provided with a driven roller 38. The driven roller 38 is a freely rotatable roller, and maintains the posture of the apparatus main body 2 by entering the first recessed portion 29*a*, the second recessed portion 29*b*, and the third recessed portion 29*c* while being drivenly rotatable in contact with the surface of the arch portion 25*a* shown in FIG. 4 when the apparatus main body 2 changes its posture. More specifically, when the driven roller 38 enters the recessed portion 29*a* in FIG. 4, the first posture of the apparatus main body 2 is maintained, when the driven roller 38 enters the recessed portion 29*b* of FIG. 4, the second posture of the apparatus main body 2 is held, and when the driven roller 38 enters the recessed portion 29*c* of FIG. 4, the third posture of the apparatus main body 2 is maintained. The spring 37 of FIG. 9 presses the driven roller 38 toward each recessed portion. To release the posture holding state of the apparatus main body 2, the operation lever 27 in FIG. 4 is operated. As a result, the slider unit 36 descends, the driven roller 38 retracts from each recessed portion, and it is possible to change the posture of the apparatus main body 2. As shown in FIG. 8, part of a lever 32 is exposed in each recessed portion, which will be described later.

Figure 2:
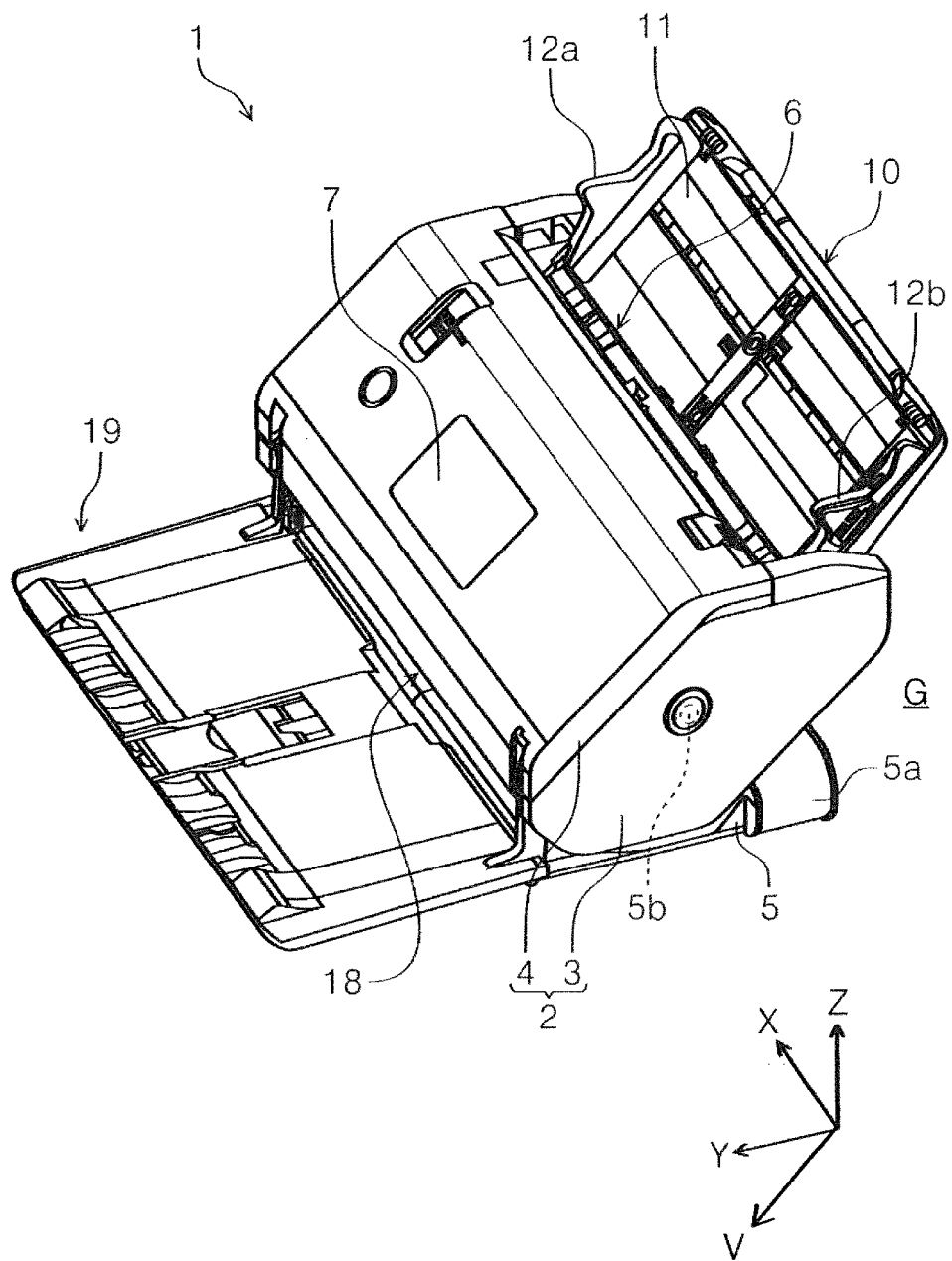
FIG. 2 is an external perspective view of the apparatus main body in the second posture as viewed from the front.
Figure 3:
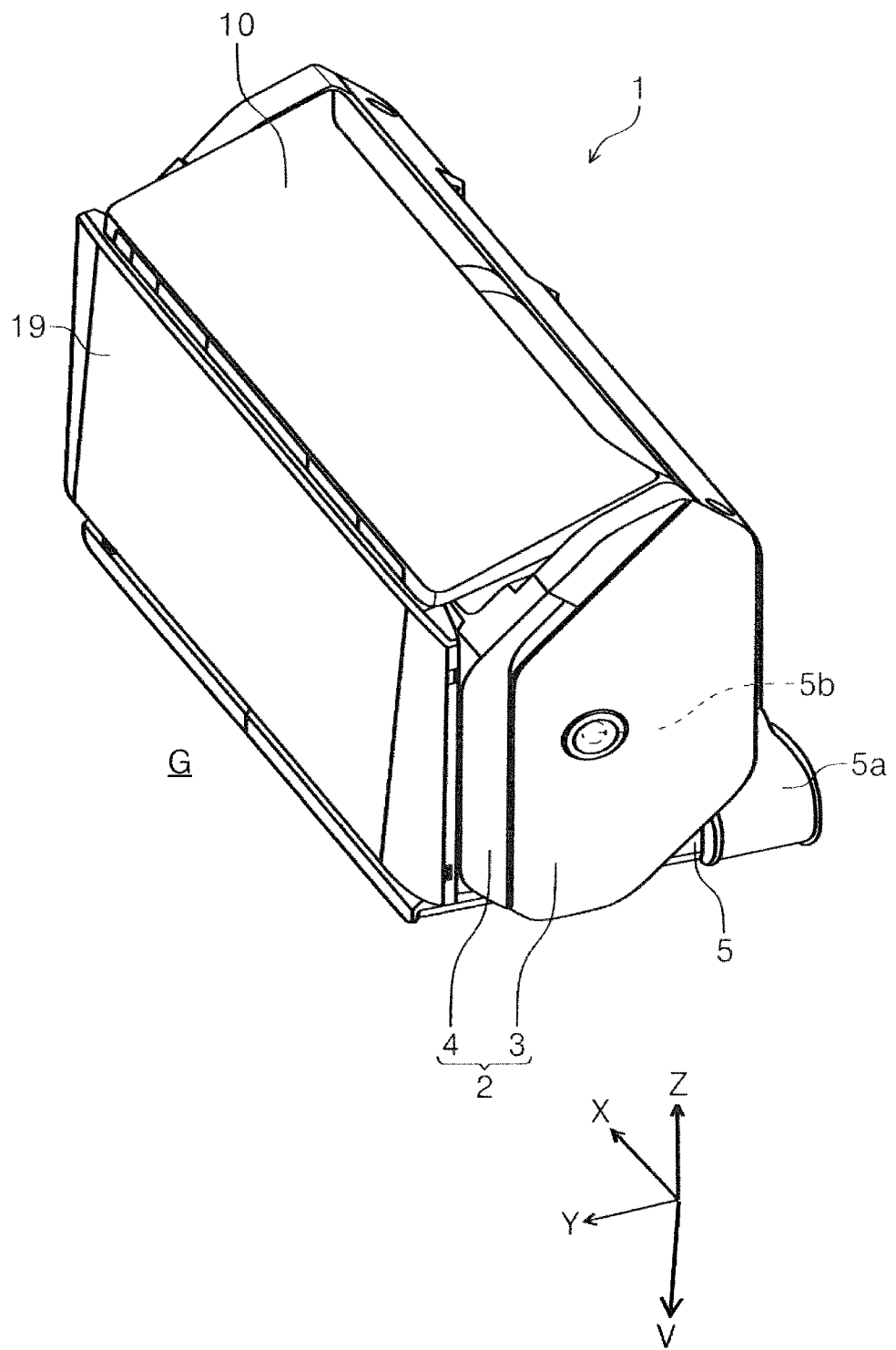
FIG. 3 is an external perspective view of the apparatus main body in a first posture as viewed from the front.

Next, as shown in FIGS. 1 to 4, the upper unit 4 includes a front cover 19, and the lower unit 3 includes a top cover 10. The front cover 19 is rotatably provided with respect to the upper unit 4, and can be in a closed state as shown in FIGS. 1, 3, 4, 6, and 7, and can be in an open state as shown in FIGS. 2 and 5 by rotation. When opened, the front cover 19 serves as a document receiving tray that receives a document that is read and discharged as shown in FIGS. 2 and 5.

The upper unit 4 includes an operation panel 7 on the upper surface on which various reading settings and reading execution operations are performed as shown in FIG. 2 and a user interface (UI) for displaying reading setting contents and the like is implemented. In the present embodiment, the operation panel 7 is a so-called touch panel through which both display and input operations can be performed, and serves as an operation unit for performing various operations and a display unit for displaying various information. The operation panel 7 is exposed by opening the front cover 19.

The top cover 10 provided on the lower unit 3 is rotatably provided with respect to the lower unit 3, and can be in a closed state as shown in FIGS. 1, 3, 4, 6, and 7, and can be in an open state as shown in FIGS. 2 and 5 by rotation. When opened, the top cover 10 serves as a document support tray that supports the fed document as shown in FIGS. 2 and 5. In FIG. 2, reference numerals 12*a* and 12*b* are edge guides for guiding the side edges of the document. A feed port 6 continuing to the inside of the apparatus main body 2 is provided at an upper portion of the apparatus main body 2, and a document placed on the top cover 10 is fed to the inside of the apparatus main body 2 from the feed port 6.

Next, a document transport path in the scanner 1 will be described mainly with reference to FIG. 5. A document transport path T2 shown in FIG. 5 is a document transport path when the apparatus main body 2 is in the posture shown in FIGS. 2, 5, and 6, that is, in the second posture. On the other hand, the document transport path T1 shows part of the document transport path when the apparatus main body 2 is in the first posture shown in FIGS. 3 and 4. A document transport path T3 shows part of the document transport path when the apparatus main body 2 is in the third posture in FIG. 7. The document transport path T is closest to the vertical when the document is in the first posture shown in FIGS. 3 and 4 (the document transport path T1), and is closest to the horizontal when it is in the third posture shown in FIG. 7 (the document transport path T3). The first posture is a posture when the apparatus is not used, and is a posture in which the projection area on the mounting face G is the smallest. The second posture and the third posture are postures when the apparatus is not used, and the third posture is a posture in which the projection area on the mounting face G is the largest. Hereinafter, the document transport paths T1, T2, and T3 are referred to as a document transport path T unless it is necessary to particularly distinguish them.

The document transport path T is a substantially straight document transport path formed between the lower unit 3 and the upper unit 4. The above-mentioned top cover 10 is provided most upstream of the document transport path T, and a feed roller 14 for feeding a document placed on the top cover 10 downstream and a separation roller 15 that nips and separates the document between the separation roller 15 and the feed roller 14 are provided downstream of the top cover 10. The feed roller 14 is in contact with the lowest document sheet among the document sheets placed on the top cover 10. Therefore, when a plurality of document sheets is placed on the top cover 10, the document sheets are fed downstream starting from the lowest document sheet in order.

The feed roller 14 receives a rotational torque from a feed motor 57 (see FIG. 10) and rotates counterclockwise in FIG. 5. Rotation torque rotating counterclockwise in FIG. 5 is transmitted to the separation roller 15 from a transport motor 58 (see FIG. 10) via a torque limiter (not shown).

Figure 10:
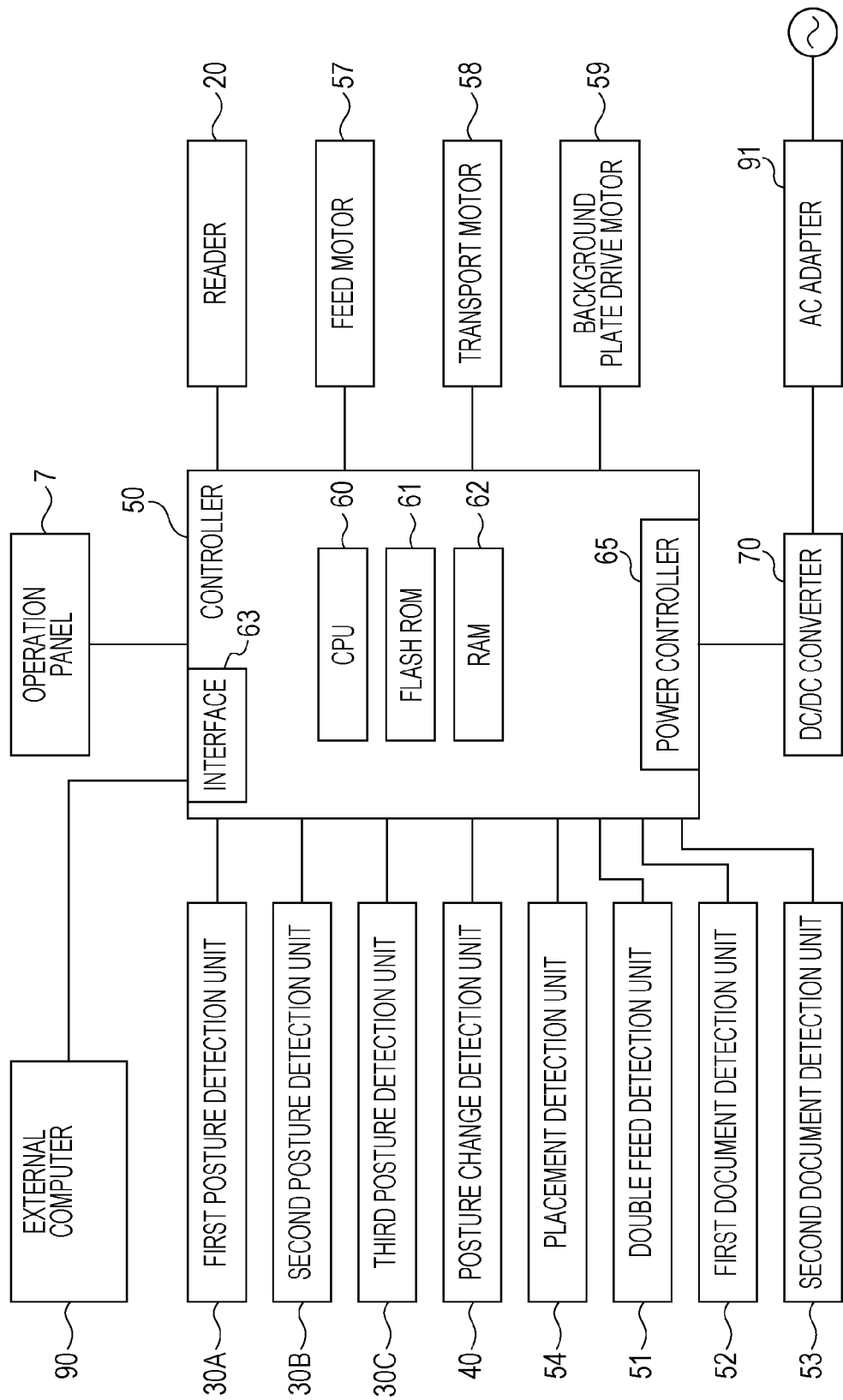
FIG. 10 is a block diagram of a control system.

When no document is interposed between the feed roller 14 and the separation roller 15, or when only one document sheet is interposed, since slippage occurs at a torque limiter (not shown), the separation roller 15 is drivenly rotated clockwise in FIG. 5 with the rotation of the feed roller 14 regardless of the rotational torque received from the transport motor 58 (see FIG. 10). When in addition to the document sheet to be fed, the second and subsequent document sheets enter between the feed roller 14 and the separation roller 15, due to slippage between document sheets, the separation roller 15 rotates counterclockwise in FIG. 5 by the rotation torque received from the transport motor 58 (see FIG. 10). As a result, double feeding of document sheets is prevented.

A transport roller pair 16 as a first feed roller pair, a reader 20 as a reading unit that reads a document image, and a discharge roller pair 17 as a second feed roller pair are provided downstream of the feed roller 14. The transport roller pair 16 includes a transport drive roller 16a that is rotationally driven by the transport motor 58 (see FIG. 10), and a transport driven roller 16b that is drivenly rotated. The document nipped by the feed roller 14 and the separation roller 15, and fed downstream is nipped by the transport roller pair 16, and then transported to a position facing an upper sensor unit 20A and a lower sensor unit 20B that are located downstream of the transport roller pair 16.

The reader 20 includes the upper sensor unit 20A, provided in the upper unit 4, located above the document transport path T and the lower sensor unit 20B, provided in the lower unit 3, located below the document transport path T. The upper sensor unit 20A has a sensor module 21A, and the lower sensor unit 20B has a sensor module 21B. In the present embodiment, the sensor modules 21A and 21B are contact image sensor modules (CISM). The topside of the document is read by the sensor module 21A located above the document transport path T, and the underside of the document is read by the sensor module 21B located below the document transport path T. The document reading surface (not shown) of the upper sensor unit 20A and the document reading surface (not shown) of the lower sensor unit 20B are parallel to the document transport path T.

The upper sensor unit 20A includes a background plate 22A at a position facing the sensor module 21B included in the lower sensor unit 20B and the lower sensor unit 20B includes a background plate 22B at a position facing the sensor module 21A included in the upper sensor unit 20A. The background plates 22A and 22B are reference plates read by the opposed sensor modules for shading correction, and examples of the background plate include a resin plate of white, gray, black, or the like, or a metal plate painted in white, gray, black, or the like.

The background plates 22A and 22B are rotatably provided by the power of a background plate drive motor 59 (see FIG. 10), and is configured to switch by rotation between the facing state in which the background plates face the facing sensor module as shown by the solid line, and the non-facing state in which the facing state is canceled as shown by the two-dot chain line. The background plates 22A and 22B are white as an example, and can acquire a white reference value in the facing state, and can acquire a black reference value in the non-facing state.

After an image on at least one of the topside and the underside of the document is read by the reader 20, the document is nipped by the discharge roller pair 17 located downstream of the reader 20, and is discharged from a discharge port 18. The discharge roller pair 17 includes a discharge drive roller 17a that is rotationally driven by the transport motor 58 (see FIG. 10), and a discharge driven roller 17b that is drivenly rotated.

Next, a control system in the scanner 1 will be described with reference to FIG. 10. FIG. 10 is a block diagram showing the control system of the scanner 1 according to the present disclosure. A controller 50 performs various other kinds of controls of the scanner 1 including feed, transport, discharge, and reading control of the document, and others. A signal from the operation panel 7 is input to the controller 50, and a signal for implementing display of the operation panel 7, in particular, a user interface (UI) is transmitted from the controller 50 to the operation panel 7.

The controller 50 controls the feed motor 57, the transport motor 58, and the background plate drive motor 59. In the present embodiment, each of the motors is a DC motor. Read data from the reader 20 is input to the controller 50, and a signal for controlling the reader 20 is transmitted from the controller 50 to the reader 20. Signals from a placement detection unit 54, a double feed detection unit 51, a first document detection unit 52, a second document detection unit 53, a first posture detection unit 30A, a second posture detection unit 30B, and a third posture detection unit 30C, a posture change detection unit 40 are input to the controller 50. Further, a detection value of an encoder (not shown) that detects the amount of rotation of each of the transport drive roller 16a and the discharge drive roller 17a is also input to the controller 50, whereby the controller 50 can detect the amount of document transported by each roller.

The controller 50 includes a CPU 60, a flash ROM 61, and a RAM 62. The CPU 60 performs various arithmetic processes according to a program stored in the flash ROM 61 and controls the operation of the entire scanner 1. The flash ROM 61, which is an example of a storage unit, is a readable and writable nonvolatile memory. Various pieces of setting information input by the user via the operation panel 7 are also stored in the flash ROM 42. Various pieces of information are temporarily stored in the RAM 61, which is an example of a storage unit.

Next, a back cover 9 (see FIG. 4) is provided on the back of the apparatus main body 2 so as to be openable and closable. When the back cover 9 is opened, a power plug coupling portion (not shown) and an interface connector (not shown) coupling portion are exposed. The interface connector coupling portion constitutes an interface 63. The scanner 1 is configured to be able to communicate with an external computer 90 via the interface 63. An example of the interface 63 includes a Universal Serial Bus (USB) interface. The scanner 1 receives power from a commercial power supply via a DC/DC converter 70 by coupling the power plug of an AC adapter 91 outside the apparatus to the power plug coupling portion. The power supplied from the DC/DC converter 70 is supplied after adjusted to a voltage suitable for respective units of the device by a power controller 65. The power controller 65 switches between supply and cutoff of power to respective units of the apparatus under the control of the CPU 60.

Next, the respective detection units provided in the document transport path T will be described. The placement detection unit 54 is a detection unit provided upstream of the feed roller 14 (see FIG. 5). The controller 50 can detect the presence or absence of the document on the top cover 10 based on the signal transmitted from the placement detection unit 54. The first document detection unit 52 is a detection unit provided between the feed roller 14 (see FIG. 5) and the transport roller pair 16 (see FIG. 5). The controller 50 can detect the passage of the leading edge or the trailing edge of the document based on the signal transmitted from the first document detection unit 52.

The double feed detection unit 51 is a detection unit provided between the feed roller 14 (see FIG. 5) and the transport roller pair 16 (see FIG. 5), and includes an ultrasonic transmitting unit and an ultrasonic receiving unit that are disposed to face each other with the document transport path T interposed therebetween. The controller 50 can detect double feeding of document sheets through a signal transmitted from the double feed detection unit 51.

The second document detection unit 53 is a detection unit provided between the transport roller pair 16 (see FIG. 5) and the reader 20 (see FIG. 5), and the controller 50 can detect the passage of the leading edge or the trailing edge of the document through a signal transmitted from the second document detection unit 53.

Next, the first posture detection unit 30A, the second posture detection unit 30B, the third posture detection unit 30C, and the posture change detection unit 40 will be described with reference to FIGS. 8, 9, and 11 to 14. As shown in FIGS. 11 to 14, the first posture detection unit 30A, the second posture detection unit 30B, and the third posture detection unit 30C are arranged at intervals along the circumferential direction of the arch portion 25a in the apparatus main body 2. Each of the detection units includes a swingable lever 32 and a detection unit 31 that detects a change in the posture of the lever 32. As shown in FIG. 8, the lever 32 included in each detection unit is provided so that part thereof is exposed in each recessed portion, and a protrusion 36a formed on the base portion 35 described with reference to FIG. 9 is configured to push the lever 32.

Figure 9:
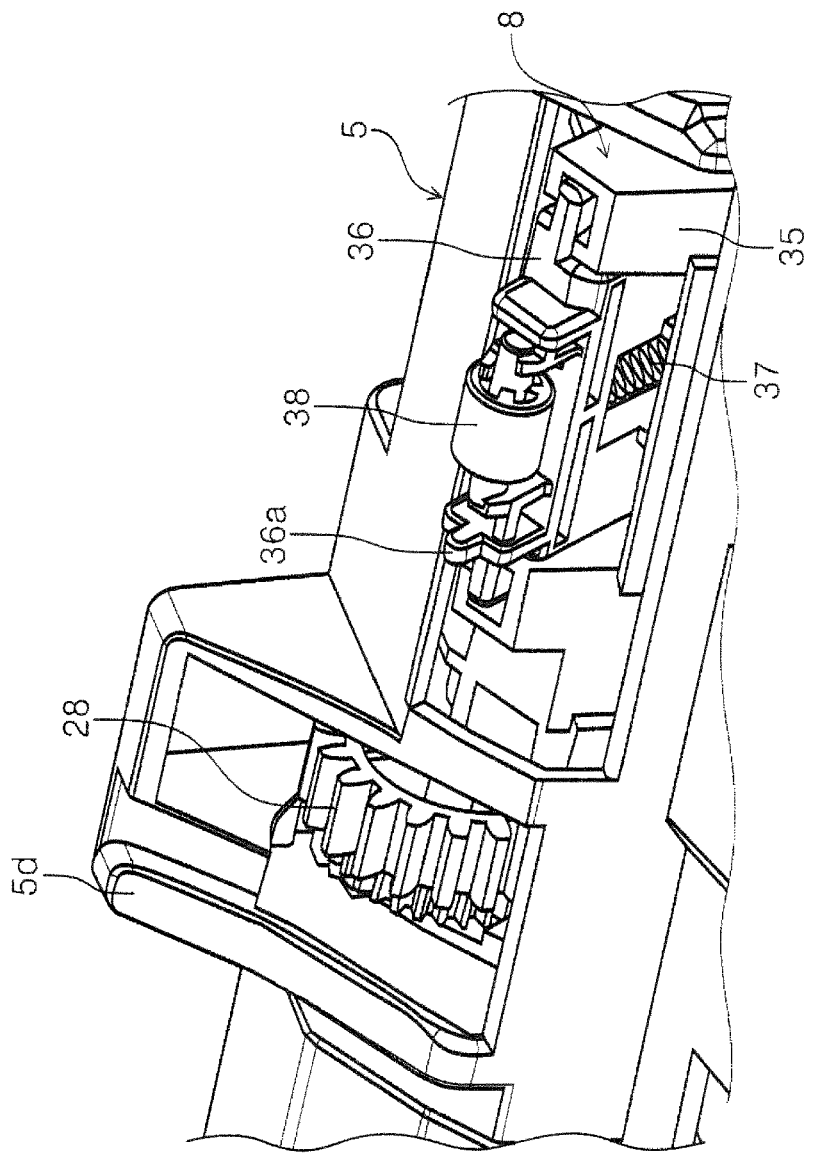
FIG. 9 is a perspective view of an advance/retreat unit.
Figure 11:
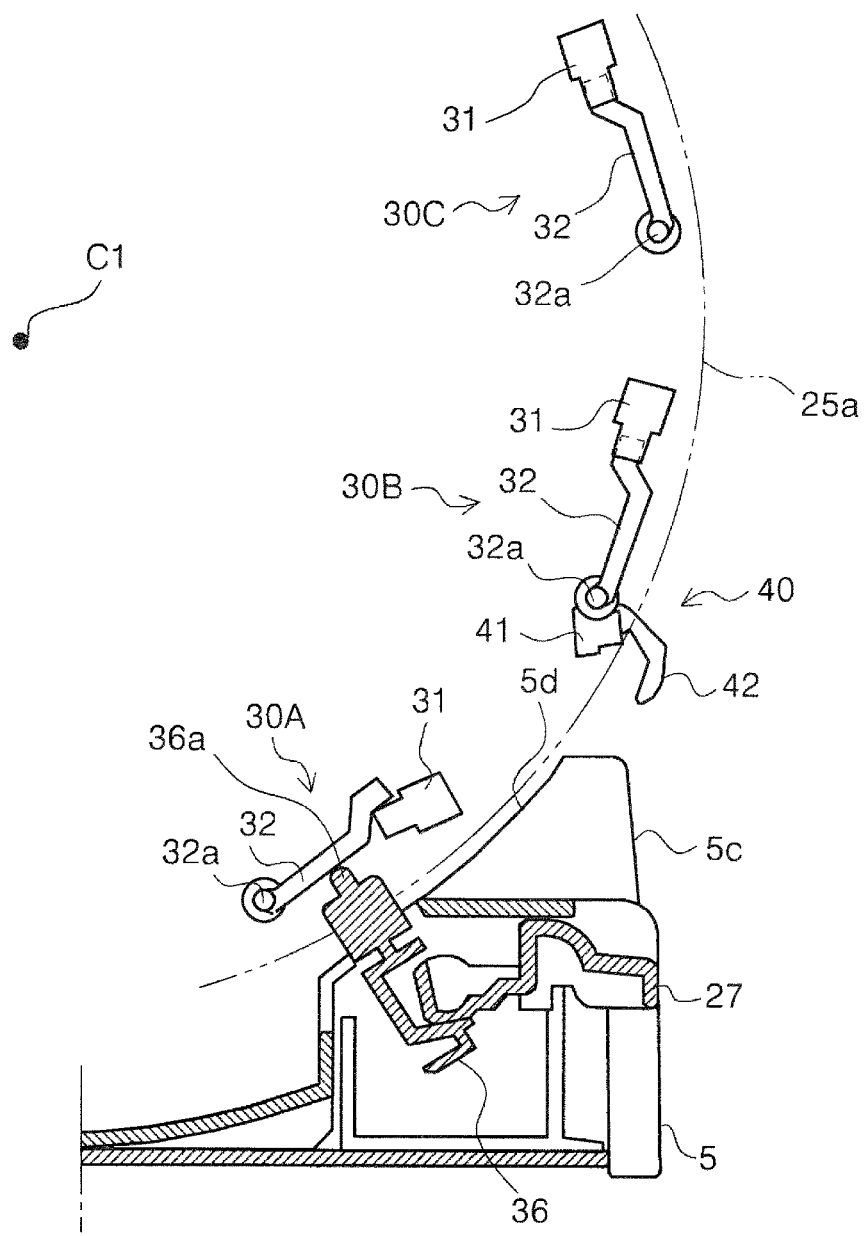
FIG. 11 is a side view of a first posture detection unit, a second posture detection unit, and a third posture detection unit.

When the driven roller 38 shown in FIG. 9 enters the first recessed portion 29a shown in FIG. 4, the protrusion 36a pushes the lever 32 constituting the first posture detection unit 30A, and the lever 32 comes off from the detection unit 31 after the lever 32 swings (see FIG. 11). As a result, the controller 50 can detect that the apparatus main body 2 has been switched to the first posture. Similarly, when the driven roller 38 shown in FIG. 9 enters the second recessed portion 29b shown in FIG. 4, the protrusion 36a pushes the lever 32 constituting the second posture detection unit 30B, and the lever 32 comes off from the detection unit 31 after the lever 32 swings (see FIG. 13). As a result, the controller 50 can detect that the apparatus main body 2 has been switched to the second posture. Similarly, when the driven roller 38 shown in FIG. 9 enters the third recessed portion 29c shown in FIG. 4, the protrusion 36a pushes the lever 32 that constitutes the third posture detection unit 30C, and the lever 32 comes off from the detection unit 31 after the lever 32 swings (see FIG. 14). As a result, the controller 50 can detect that the apparatus main body 2 has been switched to the third posture.

Further, a posture change detection unit 40 is provided near the second posture detection unit 30B in the apparatus main body 2. The posture change detection unit 40 includes a swingable lever 42 and a detection unit 41 that detects the swing of the lever 42. The lever 42 is provided so as to be able to protrude outward from the arch portion 25a of the second housing 25 as shown in FIG. 8. As shown in FIG. 8, the support unit 5 is provided with a protruding portion 5c protruding in the +Z direction, and a face 5d, of the protruding portion 5c, facing the arch portion 25a is formed as a curved face as shown in FIGS. 11 to 14. The face 5d, of the protruding portion 5c, facing the arch portion 25a is hereinafter referred to as a sensor contact face 5d.

Figure 12:
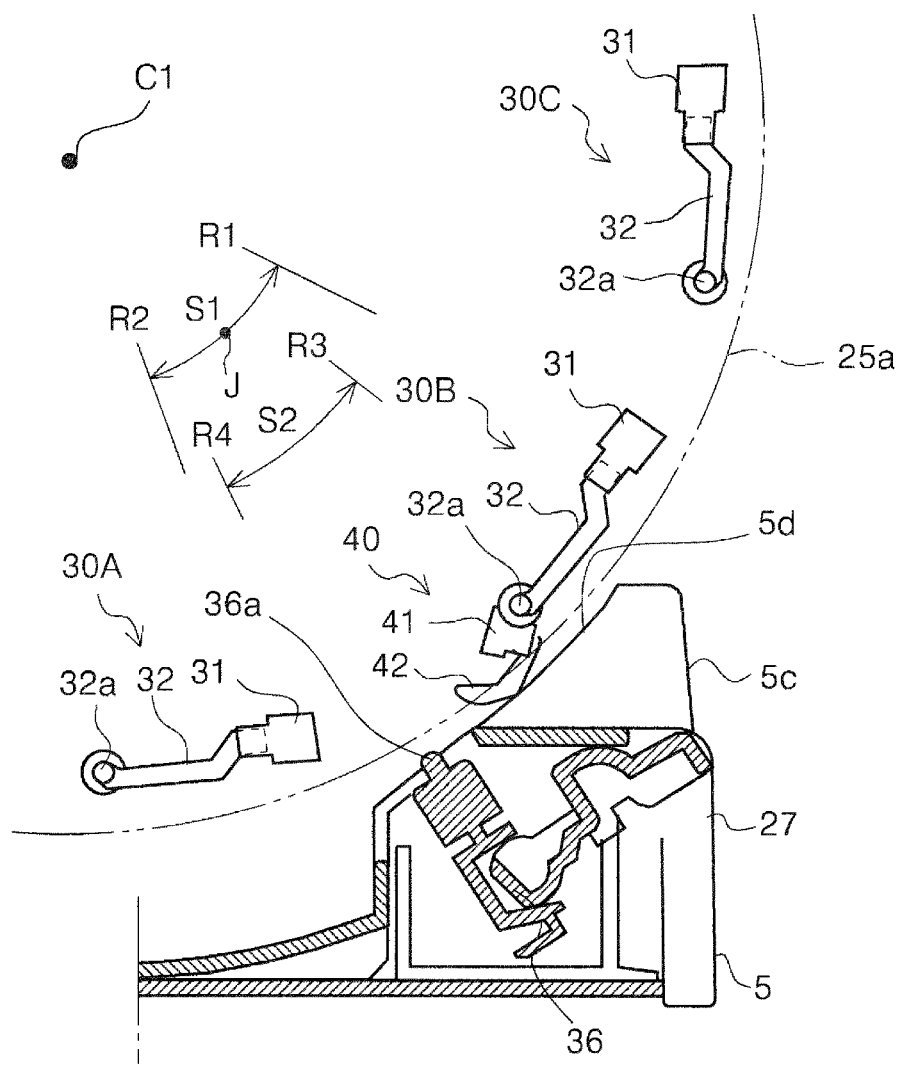
FIG. 12 is a side view of the first posture detection unit, the second posture detection unit, and the third posture detection unit.
Figure 13:
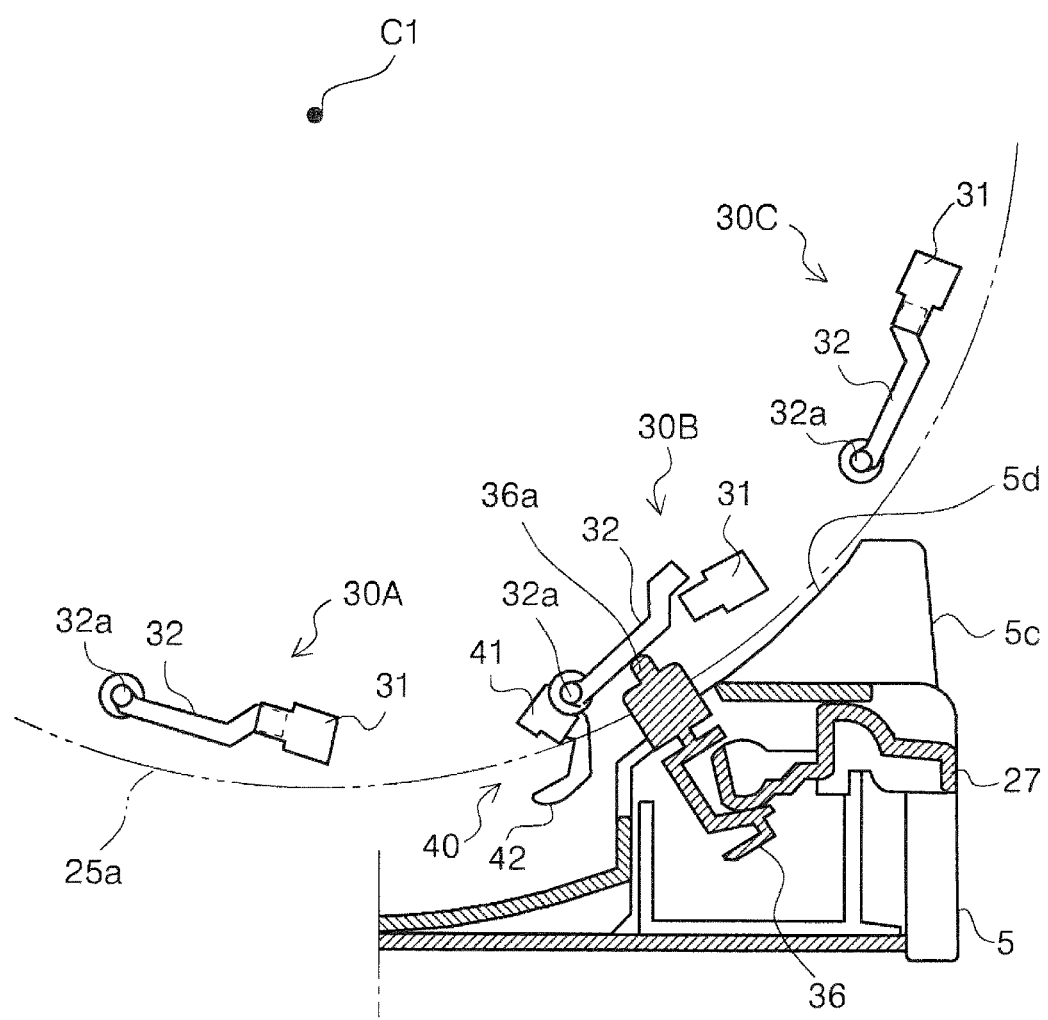
FIG. 13 is a side view of the first posture detection unit, the second posture detection unit, and the third posture detection unit.
Figure 14:
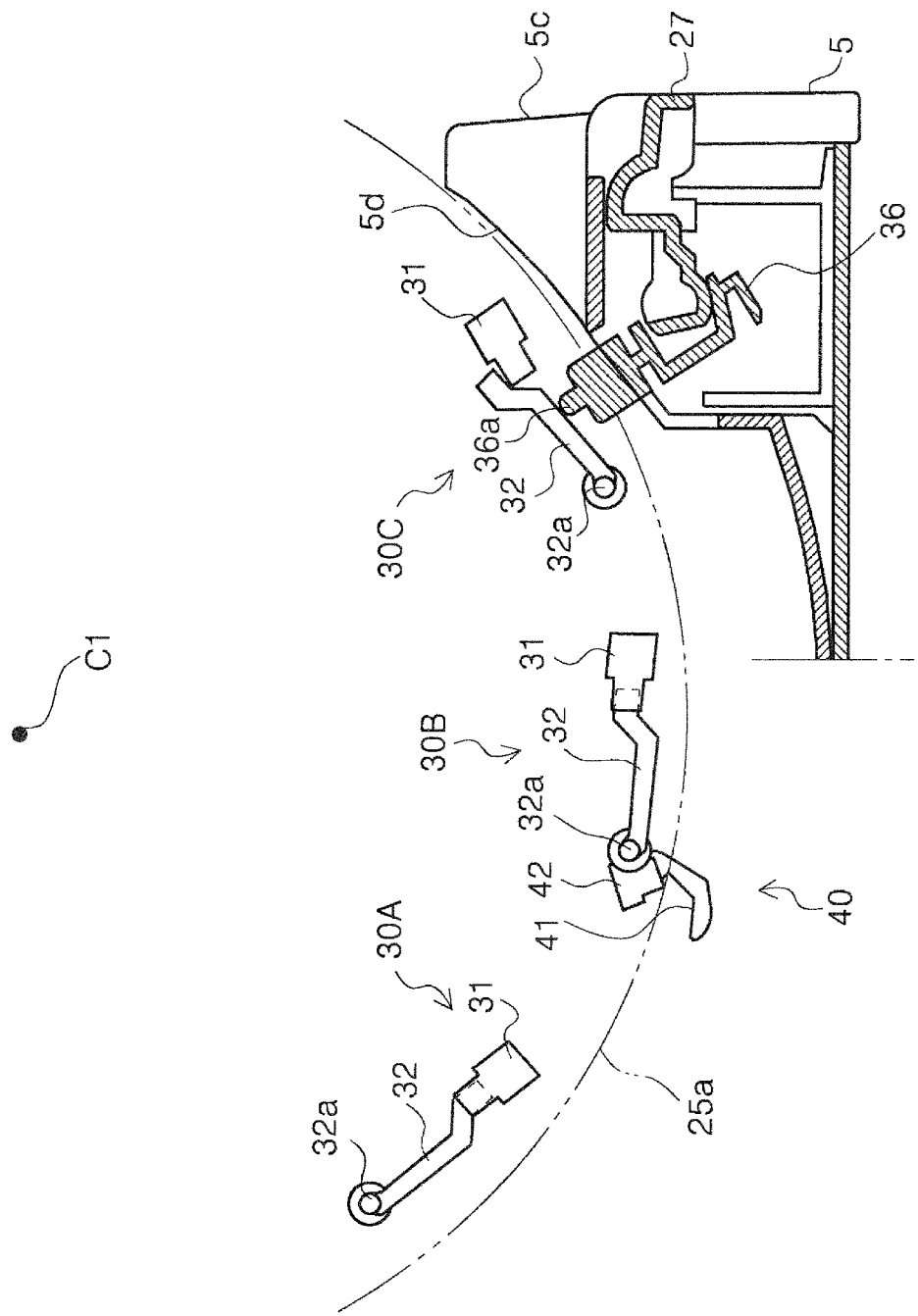
FIG. 14 is a side view of the first posture detection unit, the second posture detection unit, and the third posture detection unit.

The lever 42 is provided at a position where it can come into contact with the sensor contact face 5d. As the posture of the apparatus main body 2 changes, the lever 42 can switch between a state in which it comes into contact with the sensor contact face 5d as shown in FIG. 12, and a state in which it is away from the sensor contact face 5d as shown in FIGS. 11, 13, and 14. In FIG. 12, a range indicated by reference sign S2 indicates an angle range in which the sensor contact face 5d is formed around the rotation center cl of the apparatus main body 2, reference sign R3 indicates an upper limit position, and reference sign R4 indicates a lower limit position. A range indicated by reference sign S1 indicates an angle range in which the lever 42 moves when the apparatus main body 2 rotates between the first posture and the second posture, reference sign R1 indicates a position of the lever 42 when the apparatus main body 2 is in the first posture (see FIG. 11), and reference sign R2 indicates a position of the lever 42 when the apparatus main body 2 is in the second posture (see FIG. 13). Therefore, the range S1 can be referred to as a posture change range between the first posture and the second posture of the apparatus main body 2.

The range S2 in which the sensor contact face 5d is formed is included in a posture change range S1, and the positions R3 and R4, that is, the positions between which the lever 42 swings, are included in the posture change range S1. The position R3 is set toward the position R1 relative to the middle position J of the posture change range S1, and the position R4 is set toward the position R2 relative to the middle position J of the posture change range S1. With the posture change detection unit 40 having the above configuration, the controller 50 receives a change in signal of the posture change detection unit 40 accompanying the swing of the lever 42 while the apparatus main body 2 switches from the second posture shown in FIG. 13 to the first posture shown in FIG. 11, so that it is possible to detect that the apparatus main body 2 is in the middle of changing the posture from the second posture to the first posture. Similarly, the controller 50 receives a change in signal of the posture change detection unit 40 accompanying the swing of the lever 42 while the apparatus main body 2 switches from the first posture shown in FIG. 11 to the second posture shown in FIG. 13, so that it is possible to detect that the apparatus main body 2 is in the middle of changing the posture from the first posture to the second posture.

Next, the controller 50 has three power supply modes of a first power supply mode, a second power supply mode, and a third power supply mode in the present embodiment. The first power supply mode, a mode in which power consumption is largest, is a mode in which power is supplied to respective units of the apparatus illustrated in FIG. 10, more specifically, all the units that receive power supply, and is a power supply mode at the time of document reading. The second power supply mode, a mode in which power consumption is smaller than that of the first power supply mode, is a mode in which power is supplied only to the posture change detection unit 40 among the units of the apparatus illustrated in FIG. 10. The third power supply mode, a mode in which power consumption is smaller than that of the first power supply mode, and larger than that of the second power supply mode, is mode in which power is supplied to the posture change detection unit 40, the placement detection unit 54, the CPU 60, the flash ROM 61, the RAM 62, and the interface 63, but power is not supplied the other components of the configuration shown in FIG. 10. In particular, in the second power supply mode and the third power supply mode, power is not supplied to the first posture detection unit 30A, the second posture detection unit 30B, and the third posture detection unit 30C. Control may be performed so that the power supply to the CPU 60, the flash ROM 61, and the RAM 62 in the third power supply mode is smaller than that in the first power supply mode.

Hereinafter, the switchover of the power supply mode by the controller 50 will be described with reference to FIGS. 15 and 16. First, the switchover of the power supply mode when the posture of the apparatus main body 2 is not changed will be described with reference to FIG. 15. When a power-on operation is performed via the operation panel 7 in the power-off state (step S101), the controller 50 determines whether the posture at this time is the second posture or the third posture (step S102). In the case of the second posture or the third posture, that is, the posture at the time of document reading, (Yes in step S102), the controller 50 causes the mode to transition to the first power supply mode (step S103). Note that the power-off state may be a state in which no power is supplied to all components of the apparatus main body 2 or a state in the second power supply mode. When the determination is No in step S102, that is, when the power-on operation is performed, but the posture at this time is the first posture, the power-off state is maintained.

Next, when there is no operation for a predetermined time in the execution state of the first power supply mode (Yes in step S104), the controller 50 causes the mode to transition to the third power supply mode to suppress power consumption. The condition for transition to the third power supply mode at this time may be that in addition to no operation of the operation panel 7 for a predetermined time, the interface 63 does not receive a signal from the external computer 90 for a predetermined time.

Next, the switchover of the power supply mode when the posture of the apparatus main body 2 is changed will be described with reference to FIG. 16. When detecting a change in the posture of the apparatus main body 2 based on the detection signal of the posture change detection unit 40, (Yes in step S201), the controller 50 determines how the posture of the apparatus main body 2 is switched based on the detection signals of the first posture detection unit 30A, the second posture detection unit 30B, and the third posture detection unit 30C. When detecting a change in the posture of the apparatus main body 2 (Yes in step S201), in a case where the power supply mode at this time is the second power supply mode or the third power supply mode, that is, the mode in which no power is supplied to the first posture detection unit 30A, the second posture detection unit 30B, and the third posture detection unit 30C, the controller 50 supplies power to each of the detection units.

Next, when detecting that the posture of the posture main body 2 has been switched to the second posture or the third posture (Yes in step S202), that is, when the posture of the apparatus main body 2 is switched to the posture at the time of document reading, the controller 50 causes the mode to transition to the first power supply mode (step S203). Alternatively, when detecting that the posture of the posture main body 2 has been switched to the first posture (Yes in step S204), that is, when detecting that the posture of the apparatus main body 2 has been switched to the posture when not in use, the controller 50 causes the mode to transition to the second power supply mode (step S205). Note that even when the change in a posture of the apparatus main body 2 is detected in step S201, as long as none of the first posture detection unit 30A, the second posture detection unit 30B, and the third posture detection unit 30C detect the switchover of the posture of the apparatus main body 2, the current power supply mode is maintained (step S206).

As described above, the scanner 1 according to the present embodiment includes the apparatus main body 2 that includes the reader 20, which is a reading unit that reads an document, and that is configured to change a posture with respect to the support unit 5, the first posture detection unit 30A that detects a first posture that is a posture of the apparatus main body when not in use, the second posture detection unit 30B that detects a second posture that is a posture of the apparatus main body 2 when the reader 20 reads a document, where the apparatus main body has a projection area with respect to the mounting face G in the second posture larger than a projection area with respect to the mounting face G in the first posture, a posture change detection unit 40 that detects a change in a posture of the apparatus main body 2, and a controller 50 that controls a power supply to each of the first posture detection unit 30A, the second posture detection unit 30B, and the posture change detection unit 40. In the state of the first power supply mode in which the power is supplied to the first posture detection unit 30A, the second posture detection unit 30B, and the posture change detection unit 40 when the apparatus main body 2 is in the second posture, when the first posture detection unit 30A detects that the apparatus main body 2 has switched to the first posture, the controller 50 causes a mode to transition to the second power supply mode in which no power is supplied to the first posture detection unit 30A and the second posture detection unit 30B, but power is supplied to the posture change detection unit 40 (step S205 in FIG. 16). As a result, power consumption can be suppressed, and a dedicated user operation for shifting a state to the state in which power consumption is suppressed is not required, resulting in improved usability.

Figure 16:
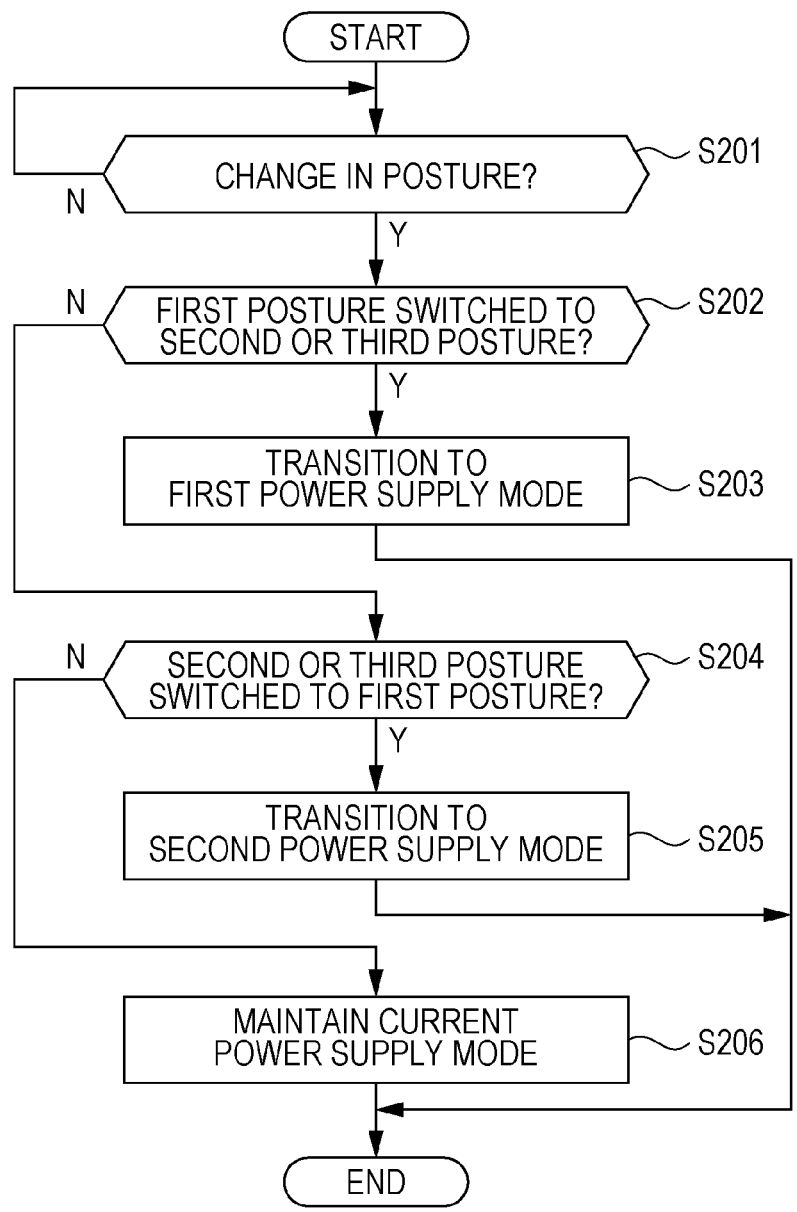
FIG. 16 is a flowchart showing the flow of switching between power supply modes.

In addition, when the posture change detection unit 40 detects the change in a posture of the apparatus main body 2 in the second power supply mode, the controller 50 supplies power to at least the second posture detection unit 30B, and when the second posture detection unit 30B detects a switchover of the apparatus main body 2 to the second posture, the controller 50 causes the second power supply mode to transition to the first power supply mode (step S202 in FIG. 16). As a result, a dedicated user operation for shifting a mode from the second power supply mode to the first power supply mode is not required, resulting in improved usability.

Figure 15:
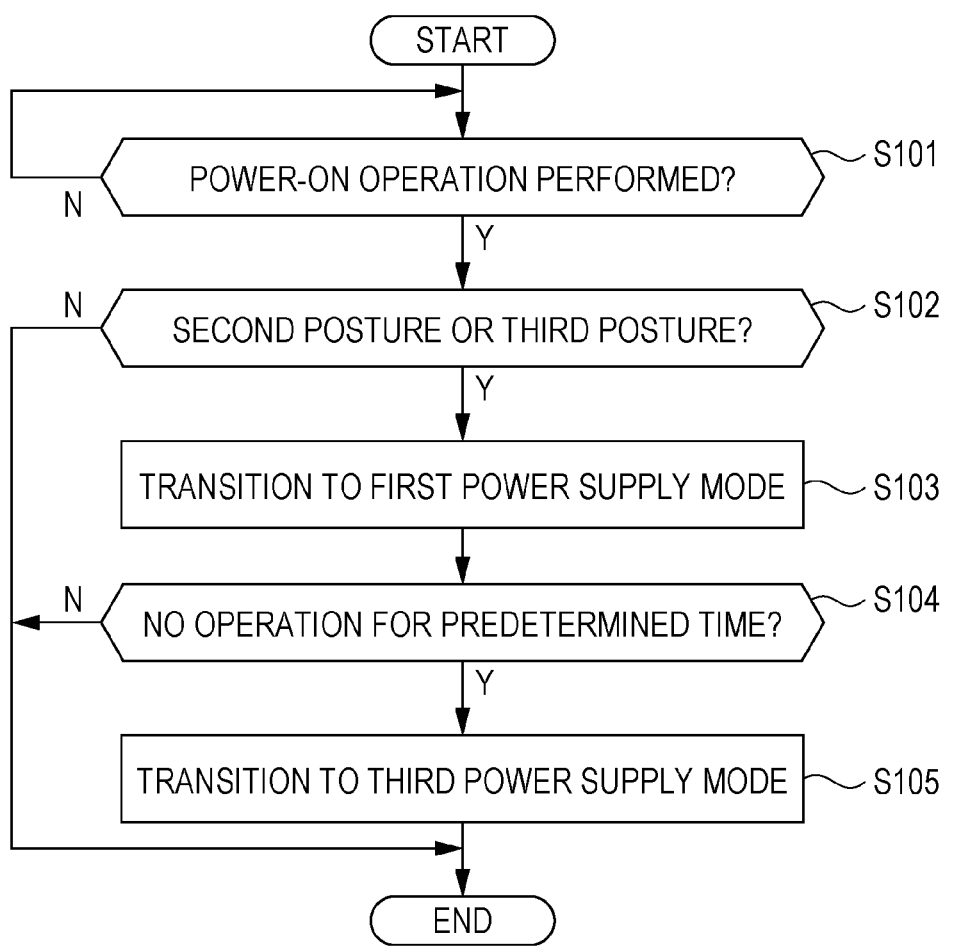
FIG. 15 is a flowchart illustrating a flow of switching between power supply modes.

Further, the image reading apparatus includes the operation panel 7 which is an operation unit that receives various operations and outputs a signal according to each the operations to the controller 50, wherein when there is no input of a signal for a predetermined time from the operation panel 7 in a state where the apparatus main body 2 is in the second posture, the controller 50 causes a mode to transition to a third power supply mode in which power is supplied to at least the posture change detection unit 40, where a power consumption of the entire image reading apparatus in the third power supply mode is smaller than a power consumption of the entire image reading apparatus in the first power supply mode and larger than a power consumption of the entire image reading apparatus in the second power supply mode (step S105 in FIG. 15). As a result, power consumption can be suppressed, and a dedicated user operation for shifting a state to the state in which power consumption is suppressed is not required, resulting in improved usability. When the posture change detection unit 40 detects the change in a posture of the apparatus main body 2 in the third power supply mode, the controller 50 supplies power to at least the first posture detection unit 30A, and when the first posture detection unit 30A detects a switchover of the apparatus main body 2 to the first posture, the controller 50 causes a mode to transition to the first power supply mode (step S203 in FIG. 16). As a result, a dedicated user operation for shifting a mode from the third power supply mode to the first power supply mode is not required, resulting in improved usability.

Further, as shown in FIG. 12, in the posture change range S1 in which the apparatus main body 2 is configured to change a posture between the first posture and the second posture, a position at which the posture change detection unit 40 is configured to detect a change in a posture of the apparatus main body 2 is set at the position R1 toward the first posture relative to the intermediate position J in the posture change range S1, and at the position R2 toward the second posture relative to the intermediate position J. As a result, when the apparatus main body 2 changes the posture from the second posture to the first posture, or conversely, when the apparatus main body 2 changes the posture from the first posture to the second posture, it is possible to detect the change quickly, so that it is possible to switch the power supply mode quickly.

In the present embodiment, the posture change detection unit 40 includes the swingable lever 42, and the detection unit 41 that detects an operation of the swingable lever 42, wherein the swingable lever 42 swings when the swingable lever 42 is switched between contact of the swingable lever 42 to the sensor contact face 5d extending along the posture change range S1 and separation of the swingable lever 42 from the sensor contact face 5d. As a result, the posture change detection unit 40 can be constituted by a so-called mechanical sensor instead of an optical sensor, so that it is possible to reduce the cost of the apparatus. Note that the optical sensor may be used instead of the mechanical sensor. In this case, for example, a linear scale is provided instead of the sensor contact face 5d, and the optical sensor that reads the linear scale instead of the lever 42 and the detection unit 41 is provided, so that the change in a posture can be detected immediately regardless of the posture of the apparatus main body 2 between the first posture and the second posture. In this case, the linear scale is preferably provided over the entire region of the posture change range S1.

The present disclosure is not limited to the embodiments described above, and various modifications are possible within the scope of the present disclosure described in the claims, and they are also included in the scope of the present disclosure.

What is claimed is:

1. An image reading apparatus comprising:
a support body that contacts a mounting face on which the image reading apparatus is mounted;
an apparatus main body that includes a reader that reads a document and is rotatably provided with respect to the support body, the apparatus main body being configured to change postures including a first posture and a second posture with respect to the support body, the second posture being a posture of the apparatus main body when the reader reads a document, a projection area with respect to the mounting face in the second posture being larger than a projection area with respect to the mounting face in the first posture;
a first posture detector that detects the apparatus main body in the first posture; and
a controller that controls a power supply, wherein
the controller has a first power supply mode and a second power supply mode in which a power consumption is smaller than a power consumption in the first power supply mode,
the controller is configured to set the first power supply mode when the apparatus main body is in the second posture, and is configured to set a second power supply mode when the apparatus main body is in the first posture, and
the controller is configured to set the first power supply mode in which power is supplied to the first posture detector when the apparatus main body is in the second posture, and is configured to set the second power supply mode in which no power is supplied to the first posture detector when the apparatus main body is in the first posture.

2. The image reading apparatus according to claim 1, further comprising:
a second posture detector that detects the apparatus main body in the second posture,
wherein the controller is configured to set the first power supply mode in which power is supplied to the second posture detector when the apparatus main body is in the second posture, and is configured to set the second power supply mode in which no power is supplied to the second posture detector when the apparatus main body is in the first posture.

3. The image reading apparatus according to claim 2, further comprising:
a posture change detector that detects a change in the posture of the apparatus main body, wherein the controller is configured to determine the change in the posture of the apparatus main body based on a detection of the posture change detector.

4. The image reading apparatus according to claim 3, wherein the controller supplies power to the posture change detector both in the first power supply mode and the second power supply mode.

5. The image reading apparatus according to claim 3, wherein
when the posture change detector detects the change in the posture of the apparatus main body in the second power supply mode, the controller supplies power to the second posture detector, and
when the second posture detector detects a switchover of the apparatus main body to the second posture, the controller switches from the second power supply mode to the first power supply mode.

6. The image reading apparatus according to claim 3, wherein when the first posture detector detects a switchover of the apparatus main body to the first posture in the first power supply mode, the controller switches from the first power supply mode to the second power supply mode.

7. The image reading apparatus according to claim 3, wherein
the apparatus main body is configured to change a third posture that is a posture of the apparatus main body when the reader reads a document, a projection area with respect to the mounting face in the third posture being larger than the projection area with respect to the mounting face in the second posture,
the controller is configured to set the first power supply mode when the apparatus main body is in the third posture, and
the controller detects the change of the apparatus main body in the third posture based on a detection of a third posture detector that detects the apparatus main body in the third posture.

8. The image reading apparatus according to claim 3, further comprising:
an operation panel that receives various operations and outputs a signal according to each of the operations to the controller, wherein
the controller has a third power supply mode in which a power consumption that is smaller than the power consumption in the first power supply mode and larger than the power consumption in the second power supply mode, and
when the apparatus main body is in the second posture and there is no input of a signal for a predetermined time from the operation panel, the controller switches from the first power supply mode to the third power supply mode.

9. The image reading apparatus according to claim 2, wherein
the apparatus main body is configured to change a third posture that is a posture of the apparatus main body when the reader reads a document, a projection area with respect to the mounting face in the third posture being larger than the projection area with respect to the mounting face in the second posture,
the controller is configured to set the first power supply mode when the apparatus main body is in the third posture, and
the controller detects the change of the apparatus main body in the third posture based on a detection of a third posture detector that detects the apparatus main body in the third posture.

10. The image reading apparatus according to claim 2, further comprising:
an operation panel that receives various operations and outputs a signal according to each of the operations to the controller, wherein
the controller has a third power supply mode in which a power consumption that is smaller than the power consumption in the first power supply mode and larger than the power consumption in the second power supply mode, and
when the apparatus main body is in the second posture and there is no input of a signal for a predetermined time from the operation panel, the controller switches from the first power supply mode to the third power supply mode.

11. The image reading apparatus according to claim 1, further comprising:
a posture change detector that detects a change in the posture of the apparatus main body,
wherein the controller is configured to determine the change in the posture of the apparatus main body based on a detection of the posture change detector.

12. The image reading apparatus according to claim 11, wherein the controller supplies power to the posture change detector both in the first power supply mode and the second power supply mode.

13. The image reading apparatus according to claim 1, wherein
the apparatus main body is configured to change a third posture that is a posture of the apparatus main body when the reader reads a document, a projection area with respect to the mounting face in the third posture being larger than the projection area with respect to the mounting face in the second posture, and
the controller is configured to set the first power supply mode when the apparatus main body is in the third posture.

14. The image reading apparatus according to claim 1, further comprising:
an operation panel that receives various operations and outputs a signal according to each of the operations to the controller, wherein
the controller has a third power supply mode in which a power consumption is smaller than the power consumption in the first power supply mode and larger than the power consumption in the second power supply mode, and
when the apparatus main body is in the second posture and there is no input of a signal for a predetermined time from the operation panel, the controller switches from the first power supply mode to the third power supply mode.

15. An image reading apparatus comprising:
a support body that contacts a mounting face on which the image reading apparatus is mounted;
an apparatus main body that includes a reader that reads a document and is rotatably provided with respect to the support body, the apparatus main body being configured to change postures including a first posture and a second posture with respect to the support body, the second posture being a posture of the apparatus main body when the reader reads a document, a projection area with respect to the mounting face in the second posture being larger than a projection area with respect to the mounting face in the first posture;
a posture detector that detects the apparatus main body in the second posture; and a controller that controls a power supply, wherein
the controller has a first power supply mode and a second power supply mode in which a power consumption is smaller than a power consumption in the first power supply mode,
the controller is configured to set the first power supply mode when the apparatus main body is in the second posture, and is configured to set a second power supply mode when the apparatus main body is in the first posture, and
the controller is configured to set the first power supply mode in which power is supplied to the posture detector when the apparatus main body is in the second posture, and is configured to set the second power supply mode in which no power is supplied to the posture detector when the apparatus main body is in the first posture.

* * * * *